Dec. 30, 1952  C. V. CATELL  2,623,779
AUTOMATIC CONVERTIBLE STEEL TOP
Filed March 16, 1950
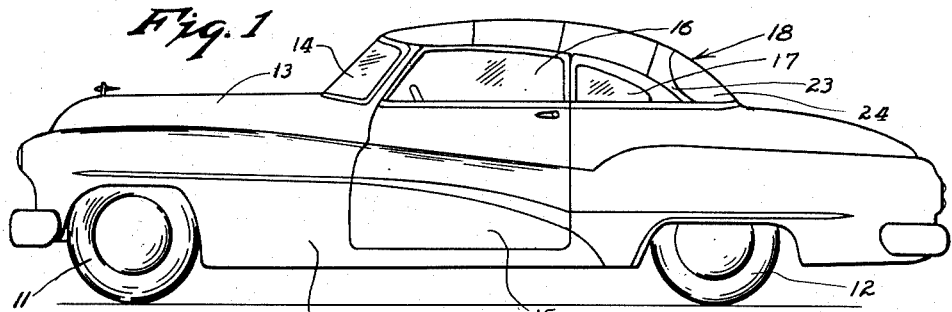
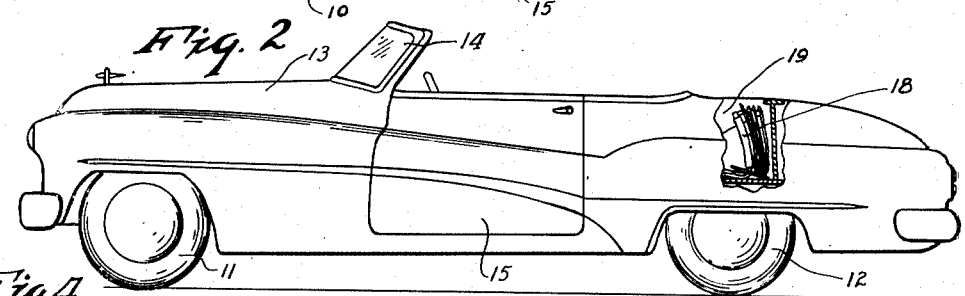
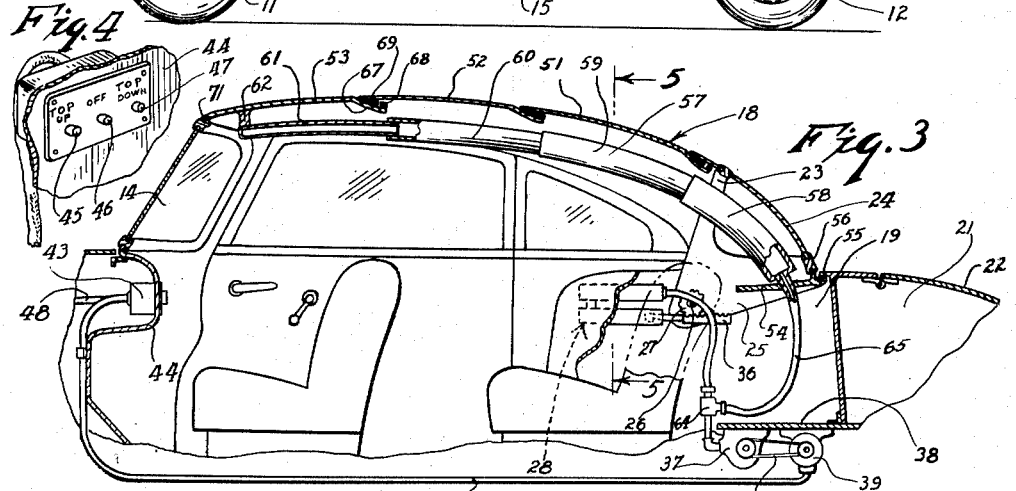
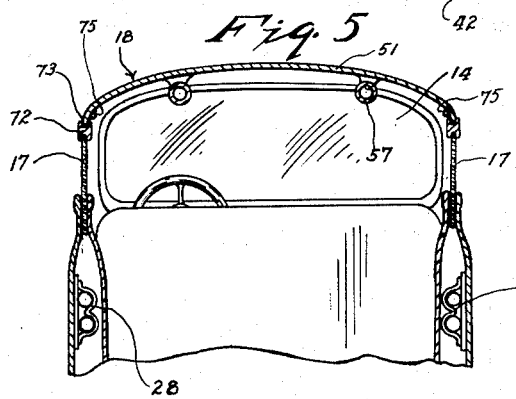
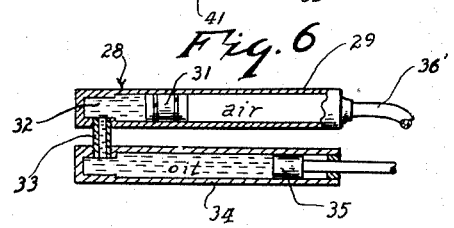
INVENTOR.
CHARLES V. CATELL
BY
Laforest S. Saulsbury
ATTORNEY Patented Dec. 30, 1952

2,623,779

UNITED STATES PATENT OFFICE 2,623,779

AUTOMATIC CONVERTIBLE STEEL TOP

Charles V. Catell, Bangor, Maine

Application March 16, 1950, Serial No. 150,029

3 Claims. (Cl. 296—107)

This invention relates to an automatic convertible steel top for automobiles.

It is an object of the present invention to provide a convertible steel top for automobiles which can be operated by merely turning a switch or depressing a button on the dashboard of the automobile to either cause the top to be extended over the body or to be withdrawn and wherein when the same is withdrawn it will be stored in a compartment at the rear of the automobile and completely enclosed and out of view.

It is another object of the present invention to provide an automatic convertible steel top for automobiles wherein the operating mechanism constitutes telescoping parts actuated by the forcing of air into such parts to extend them and to retract them, by causing a vacuum to be created by the same air system and wherein a pivoted carriage or rear support is provided for the collapsed top parts which will be operated from the same air system automatically and in proper timed relation to extend the rear support or carriage out of the rear compartment of the automobile or to withdraw the same at the end of the retracting action of the telescoping parts to lower the top in its collapsed and retracted condition into the rear compartment of the automobile.

Other objects of the present invention are to provide an automatic convertible steel top for automobiles which is of simple construction, inexpensive to manufacture, actuated by simple devices, has a minimum number of parts, provides for the sealing of the top parts when extended and of the top parts upon one another and of the top parts on the window supporting edges, adapted to be withdrawn into a compartment in the rear of the automobile, compact, of pleasing appearance and efficient in operation.

For other objects and for a better understanding of the invention, reference may be had to the following detailed description taken in connection with the accompanying drawing in which Fig. 1 is a side elevational view of an automobile with the top of the present invention extended to a raised position.

Fig. 2 is a side elevational view of an automobile with the top down and withdrawn into a compartment in the rear thereof, the automobile being broken away to show the assembled top parts lying therein.

Fig. 3 is a fragmentary longitudinal sectional view of the automobile and of the convertible top and showing in detail the automatic operating mechanism which extends and retracts the top.

Fig. 4 is a perspective view of the control unit connected to the dashboard of the automobile.

Fig. 5 is a transverse sectional view of the automobile and of the top structure taken on line 5—5 of Fig. 3.

Fig. 6 is a sectional view of the air and oil unit forming a part of the operating mechanism.

Referring now to the figures, 10 represents an automobile body having forward supporting wheels 11 and rear supporting wheels 12. In rear of hood portion 13 is the usual inclined windshield 14. In the side of the body is a door 15 having a vertically adjustable window 16. In rear of the door and in the side of the body is a rear side window 17 that can be lowered into the side of the body. These windows 16 and 17 provide supports for the automatic convertible steel top 18 embodying the features of the present invention. The forward end of the top is supported upon the windshield 14. The rear of the automobile has a compartment 19 into which the convertible top is lowered and stored when not in use. This compartment 19 lies ahead of the usual rear compartment 21 lying under rear cover 22.

The convertible steel top includes a rear cover part 23 in which is a window 24. This rear cover part is pivotally supported by arms 25 pivotally connected respectively to the sides of the automobile and adapted to carry the assembly into and out of the compartment 19. The pivot connections of the arms 25 with the sides of the automobile body are indicated at 26 and carry a small gear 27. At each side of the body and lying in the wall thereof is a combined air and oil unit 28. This unit has an air cylinder 29 in which is a slidable piston 31. In one end of the cylinder 29 is a body of oil 32 which can be passed through a pipe 33 to an oil cylinder 34. This oil under pressure by piston 31 will force a piston 35 to move within the cylinder 34. This piston 35 carries a rack 36 that meshes with the small gear 27 so that as the part 28 is actuated, the rear cover part will be moved into or out of the compartment 19 because of its pivoted connection with the arms 25. There are preferably two of these units 28, one at each side of the automobile. They are supplied with air under pressure from a pipe or hose 36' connected to the air cylinder 29. An air pump 37 is carried on the under side of a floor 38 in the bottom of the compartment 19.

This pump 37 is driven by an electric motor 39 through a pulley belt 41. A cable 42 extends through the automobile body to a switch box 43 mounted on dashboard 44 and having switch buttons 45, 46 and 47. A cable 48 also leads to the switch box 43 from a battery supply source, not shown. The electric motor 39 is a reversible one and the direction of its rotation will vary according to which of the buttons 45 or 47 is depressed.

Assuming that the button 45 is pressed, the electric motor 39 will be started and the pump 37 will force air under pressure to the air cylinder 29 to cause the oil cylinder 34 to be operated in such a manner that the rack 36 working on gear 27 will cause the rear cover 23 to be elevated from the position shown in Fig. 2 to the position shown in Fig. 3, taking with it other cover parts 51, 52 and 53. These cover parts slide over one another to provide the complete cover for the automobile body.

The supporting arms 25 of the rear cover part 23 are joined by a transverse member 54 so that the arms 25 are lifted in unison. This transverse member has an edge which extends rearwardly to engage with a lip 55 projecting over the compartment 19 at the rear side thereof. The transverse member 54 has a strip of sealing material, as indicated at 56, to bear against the lip 55 in a water tight manner.

To effect the extension of the parts 51, 52 and 53, after the assembly has been lifted out of the compartment, there is provided at each side of the cover a telescoping unit 57 having telescopically arranged tubular or cylindrical parts 58, 59, 60 and 61 of varying sizes. These telescopic parts are slightly curved differently, but only to such degree that they will conveniently enter one another without interference. The smallest part 61 is closed at its forward end and also is anchored at its forward end, as indicated at 62, to the forwardmost cover part 53.

A fitting 64 is provided between the pump 37 and the hose 36' to provide air communication with a hose 65 for delivery of air to the large cylinder 58. The pump 37 continues to operate until all of the cover parts have been extended.

Each of the cover parts 51, 52 and 53 has its rear end depressed or bent down, as indicated at 67 to form a downwardly inclined member. A sealing strip 68 is provided upon this edge which will engage with a sealing strip 69 provided upon the under surface of the forward edge of the cover part. As these sealing strips join one another, the cover is made water tight. Also in this manner, the parts are made rattle-proof.

A sealing strip 71 is provided across the top of the windshield 14 to provide for a water tight connection at this location. The side edges of the cover parts run in guide channels 72 on the windows 16 and 17. These channels may be lined with compressible rubber sealing strips 73.

To return the cover parts to the compartment 18, the button 47 is pushed. The electric motor 39 will run in the reverse direction and accordingly the pump 37 will suck out air from the telescopic devices 57 to retract the parts thereof and at the same time the air will be withdrawn from the cylinder 29 to move the rack 36 in the opposite direction to lower the cover parts which will have been aligned with one another into the compartment 19.

It should now be apparent that there has been provided a convertible steel top for automobiles which requires only a few parts assembled to one another so that they can be extended or retracted by a simple operating mechanism and wherein when the parts are to be retracted, they are collected and assembled and dropped into the rear of the automobile body by simple arm supports that act automatically in proper timed relationship to the actuation of the telescopic members of the operating mechanism. Automatically the arm supports will be lifted to raise the assembly when the cover parts are to be extended.

It will be apparent that the operations are carried out automatically by a simple pushing of the proper button upon the dash of the automobile. The parts are extended and the supports lifted by air under pressure, but are returned by the creation of a vacuum in the parts of the operating mechanism.

It will be further apparent that by having the depressed ends 67 the cover parts will overlap one another but their top faces will lie flush to provide a continuous and smooth top surface. The top cover parts are curved to shape the top.

The telescopic devices are of metal and may be finished in chrome for a deluxe appearance. The cover parts are held securely in their extended positions by projections 75 at the opposite sides of the parts which may enter complementary recesses in the adjoined part. Also the parts may be held in their extended positions by maintaining a constant pressure of air in the system. Both means may be used to hold the parts together and extended or the one means may be regarded as sufficient.

It will be further apparent that the entire cover is supported, when collapsed, from two points on the automobile. An air pressure gauge may be provided on the panel so that the air pressure in the system can be checked. If desired, a compression tank can be used for supplying the air pressure for the operation of the telescopic devices. The hydraulic and air operating devices may be synchronized in the usual manner.

While various changes may be made in the detail construction, it shall be understood that such changes shall be within the spirit and scope of the present invention as defined by the appended claims.

I claim:

1. In an automobile, a body having a rear compartment, windshield and side window portions extending upwardly from the body and providing a top cover support, a convertible top cover construction comprising cover parts slidable over one another, the forward cover part engageable with the top of the windshield and the rear cover part engageable with the edge of the rear compartment, arm supports connected to the rear cover part and adapted to swing the collected cover parts out of and into the compartment, operating means for actuating said arm supports to extend the cover parts and for retracting the same, said operating means including an air pump for supplying air under pressure, an air operated device connected to the arm supports, telescopic devices connected to said air pump and disposed at each side of the convertible top to extend the cover parts thereof by pressure of air supplied by said air pump, said pump means operable in a reverse direction to create a vacuum in the telescopic devices to effect the retraction of the same and the return of the cover parts to the rear compartment.

2. In an automobile, a body having side portions, a windshield and a rear compartment, a top cover construction adapted to engage said windshield and comprising a plurality of overlapping cover elements, arm supports connected to the rear cover element at the opposite sides thereof and having a pivot connection respectively with the respective side portions of the body, an air operated device having a rack thereupon, a gear connected to each arm support and engaging with the rack to be operated by the same and to effect the angular pivotal adjustment of the arm supports, a telescopic device comprising a plurality of interfitting tubular members connected to the forward and rear cover elements, air pump means connected to said air device and said tubular members to supply either air under pressure or to effect a vacuum within said device and said tubular members whereby the cover parts and the arm supports will either be extended from the body or retracted into the body, and said air pump means including an electric motor and a switch control device adapted to be disposed upon the forward part of the automobile body.

3. A convertible steel top construction, a recessed body, a plurality of overlapping cover parts for covering said body, telescopic means comprising a plurality of interfitting tubular members for extending and retracting said cover parts, arm supports extending inwardly from the last cover part and pivotally connected to the sides of said body whereby to guide the assembly comprised of the cover parts and telescopic means into and out of the recess in said body, a combined air and hydraulic mechanism comprising a pair of interconnected cylinders, an air line extending from one of said cylinders, and a rack, an arm support operable by said rack to lift the assembly of cover parts and telescopic means, and air pressure means connected to the mechanism and the tubular members whereby simultaneously to lift the arm supports and increase the air pressure in said tubular members to extend said cover parts over said body.

CHARLES V. CATELL.

REFERENCES CITED

The following references are of record in the file of this patent:

UNITED STATES PATENTS

| Number | Name | Date |
|---|---|---|
| 1,230,109 | Byron | June 19, 1917 |
| 1,278,837 | Birney | Sept. 17, 1918 |
| 1,306,836 | Perlman | June 17, 1919 |
| 1,321,913 | Hedges | Nov. 18, 1919 |
| 2,013,314 | Metz | Sept. 3, 1935 |
| 2,496,437 | Bramble | Feb. 7, 1950 |
| 2,509,623 | Baade | May 30, 1950 |

FOREIGN PATENTS

| Number | Country | Date |
|---|---|---|
| 223,789 | Great Britain | Oct. 30, 1924 |
| 573,355 | Great Britain | Nov. 16, 1945 |